United States Patent
Kottke (10) Patent No.: US 7,853,819 B2
(45) Date of Patent: Dec. 14, 2010

(54) METHOD AND DEVICE FOR CLOCK CHANGEOVER IN A MULTI-PROCESSOR SYSTEM

(75) Inventor: Thomas Kottke, Ehningen (DE)

(73) Assignee: Robert Bosch GmbH, Stuttgart (DE)

( * ) Notice: Subject to any disclaimer, the term of this patent is extended or adjusted under 35 U.S.C. 154(b) by 549 days.

(21) Appl. No.: 11/666,405

(22) PCT Filed: Oct. 25, 2005

(86) PCT No.: PCT/EP2005/055539

§ 371 (c)(1),
(2), (4) Date: Mar. 18, 2008

(87) PCT Pub. No.: WO2006/045802

PCT Pub. Date: May 4, 2006

(65) Prior Publication Data

US 2008/0209251 A1 Aug. 28, 2008

(30) Foreign Application Priority Data

| Oct. 25, 2004 | (DE) | .................. 10 2004 051 937 |
| Oct. 25, 2004 | (DE) | .................. 10 2004 051 950 |
| Oct. 25, 2004 | (DE) | .................. 10 2004 051 952 |
| Oct. 25, 2004 | (DE) | .................. 10 2004 051 964 |
| Oct. 25, 2004 | (DE) | .................. 10 2004 051 992 |

(51) Int. Cl.
*G06F 1/00* (2006.01)
*G06F 1/26* (2006.01)
*G06F 1/12* (2006.01)
*G06F 15/00* (2006.01)
*G06F 11/00* (2006.01)

(52) U.S. Cl. ............ 713/501; 713/320; 713/323; 713/375; 712/28; 712/32; 712/229; 714/10; 714/703; 714/746; 714/799

(58) Field of Classification Search .............. 713/320, 713/322, 501, 375; 712/28, 32, 229; 714/10, 714/703, 746, 799
See application file for complete search history.

(56) References Cited

U.S. PATENT DOCUMENTS

| 4,823,256 | A | 4/1989 | Bishop et al. |
| 5,751,932 | A | 5/1998 | Horst et al. |
| 5,758,132 | A * | 5/1998 | Str.ang.hlin .............. 713/501 |
| 6,615,366 | B1 | 9/2003 | Grochowski et al. |

(Continued)

FOREIGN PATENT DOCUMENTS

CN 1185847 6/1998

(Continued)

OTHER PUBLICATIONS

International Search Report, PCT International Patent Application No. PCT/EP2005/055539, dated Sep. 13, 2006.

*Primary Examiner*—Stefan Stoynov
(74) *Attorney, Agent, or Firm*—Kenyon & Kenyon LLP (57) ABSTRACT

A unit and method for clock changeover in a system having at least two processing units, in which switchover device(s) are provided by which a switchover between at least two operating modes of the system is able to be implemented in which a clock pulse changeover is carried out in at least one processing unit in a switching of the operating mode.

21 Claims, 6 Drawing Sheets

U.S. PATENT DOCUMENTS

| | | | |
|---|---|---|---|
| 6,640,313 B1 * | 10/2003 | Quach | 714/10 |
| 7,134,031 B2 * | 11/2006 | Flautner | 713/322 |
| 7,290,289 B2 * | 10/2007 | Janke et al. | 726/34 |
| 2002/0073357 A1 | 6/2002 | Dhong et al. | |
| 2004/0076189 A1 * | 4/2004 | Boerstler et al. | 370/516 |
| 2004/0123201 A1 | 6/2004 | Nguyen et al. | |

FOREIGN PATENT DOCUMENTS

| | | |
|---|---|---|
| JP | 7-121483 | 5/1995 |
| JP | 9 128347 | 5/1997 |
| JP | 2000-200255 | 7/2000 |
| WO | WO 9630832 | 10/1996 |
| WO | WO 03/010638 | 2/2003 |

* cited by examiner

METHOD AND DEVICE FOR CLOCK CHANGEOVER IN A MULTI-PROCESSOR SYSTEM

FIELD OF THE INVENTION

The present invention relates to methods and devices for clock changeover in a multi-processor system.

BACKGROUND INFORMATION

In technical applications, in particular such as in the motor vehicle or the industrial goods sector, i.e., in the engineering and automation industries, for instance, the use of control and regulation systems for safety-critical applications based on microprocessors or computers is growing steadily. Today, dual processor systems or dual core systems are commonly used processor systems for safety-critical applications, especially inside the vehicle, such as anti-lock braking systems, the electronic stability program (ESP), X-by-wire systems such as drive-by-wire or steer-by-wire as well as brake-by wire, etc., or in other networked systems as well. These high safety requirements in future applications call for powerful error-detection mechanism and error-treatment mechanism, in particular in order to counteract transient faults as they occur, for example, in the minimization of the semiconductor structures of the processor systems. It is relatively difficult to protect the core itself, i.e., the processor. As mentioned, one solution for this problem is the use of a dual processor system or dual core system for error detection.

Such processor units having at least two integrated execution units are therefore also referred to as dual core or multi-core architectures. According to conventional systems, such dual core or multi-core architectures are proposed mainly for two reasons:

For one, their use allows an increase in output, i.e., enhanced performance, by regarding and treating the two execution units or cores as two computing units on one semiconductor component. In this configuration, the two execution units or cores process different programs or tasks. This allows an increase in performance, which is why this configuration is called performance mode.

The second reason for realizing a dual core or multi-core architecture is an increase in reliability since both execution units process the same program in redundant fashion. The results of the two execution units or CPUs, i.e., cores, are compared, and an error may then be detected in the comparison for agreement. In the following text this configuration is called safety mode or also error detection mode.

As a result, today there are, on the one hand, dual or multiprocessor systems which operate redundantly in order to detect hardware errors (cf. dual core or master-checker systems) and, on the other hand, dual or multiprocessor systems, which process different data on their processors. If one then combines these two operating modes in one dual or multiprocessor system (for the sake of simplicity, this is called a dual processor system exclusively from now on although the devices and methods hereof may just as well be used in multiprocessor systems), the two processors must receive different data in performance mode and the same data in error detection mode.

SUMMARY

Example embodiments of the present invention provide a unit and a method that switches over the phase of the clocks or also the clock of the two processors relative to each other, as a function of the processor mode, as protection against common cause errors.

Such a unit is not known heretofore. It allows the effective, reliable operation of a dual processor system so that a switchover during operation may be implemented in both safety and performance mode. In the following text the term processors is used, but this term also encompasses cores or processing units.

Furthermore, example embodiments of the present invention provide a method and a device which allow an optimization of the function within the framework of the switchover between the operating modes.

DETAILED DESCRIPTION

In a dual processor system there are two processors, which are able to process the same or different tasks. These two processors of the dual processor system may process these tasks in clock synchronism or at a clock pulse offset. If a dual processor system for error detection is built, it may be provided that these two processors operate at a clock pulse offset in order to avoid common mode errors. This method is most effective if an offset other than an integral offset is selected. If the two processors process different tasks, then it is more advantageous to have them operate in clock edge synchronism since the external components such as memories are able to be triggered by the clock pulse of one processor only. If a dual processor system is to be used which is able to switch over between these two modes, it is therefore optimized with respect to one operating mode only.

According to example embodiments of the present invention, this is compensated in that, in the dual processor system (or multi-processor system) having the ability to switch over between two modes such as safety and performance, the two processors operate at a clock pulse offset in safety mode and without a clock pulse offset in performance mode. No clock pulse offset in performance mode is advantageous since the external components such as memories are mostly operated at a lower clock pulse frequency and, with respect to the clock pulse edge, are fittingly configured for one processor only. The second, clock-pulse offset processor would otherwise have a waiting cycle with each memory access since it triggers the external component half a clock pulse too late.

Due to a clock changeover for a dual processor system, the optimum in error detection is derived in safety mode and the maximum in performance in performance mode.

As a result, example embodiments of the present invention are based on a unit for clock changeover in a system having at least two processing units and on a corresponding system having such a unit; switchover device(s) (mode switch) being included by which a switchover may be performed between at least two operating modes of the system, and the unit being configured such that a clock changeover is implemented in at least one processing unit in a switchover of the operating mode.

Also shown is a method for clock changeover in a system having at least two processing units, switchover device(s) being provided by which a switch between at least two operating modes of the system is implementable, and a clock changeover taking place in at least one processing unit when the operating mode is switched.

In one mode, the two processors operate at a clock pulse offset, which may be mutually offset both by whole clock pulses or also fractions of the clock pulse. Another variant consists of using a different clock pulse frequency in the two modes. In the safety-critical mode, for instance, a lower clock pulse than in performance mode may be used so as to suppress interference. These two variants may also be combined.

The first operating mode corresponds to a safety mode in which the two processing units process the same programs and/or data, and comparison means are provided, which compare the states occurring in the processing of the same programs for agreement.

The unit or the method allows the optimized implementation of the two modes in a dual processor system.

If both processors are operating in fault detection mode (F mode), then the two processors receive the same data/instructions, and if they are operating in performance mode (P mode), then each processor is able to access the memory. Then this unit administers the accesses to the memory or periphery, of which only one is provided.

In F mode, the unit takes over the data/addresses of one processor (called master here) and forwards them to the components such as memory, bus, etc. The second processor (slave in this case) wishes to perform the same access. The data distribution unit accepts this at a second port, but does not forward the query to the other components. The data distribution unit hands over to the slave the same data it supplies to the master and compares the data of the two processors. If they differ, then the data distribution unit (DDU) indicates this by a fault signal. Therefore, only the master is processing to the bus/memory, and the slave receives the same data (method of functioning as in a dual core system).

In P mode, both processors process different program parts. The accesses to the memory thus differ as well. The DDU therefore accepts the request of the processors and returns the results/requested data to the particular processor that had requested it. If both processors want access to a component at the same time, one processor is put into a waiting state until the other has been serviced.

The switchover between the two modes, and thus the different mode of operation of the data distribution unit, is implemented by a control signal. This may be generated either by one of the processors or externally.

If the dual processor system is operated in F mode at a clock pulse offset, and without such in P mode, then the DDU delays the data for the slave correspondingly, or it stores the output data of the master until it is able to be compared to the output data of the slave for fault detection.

Figure 1:
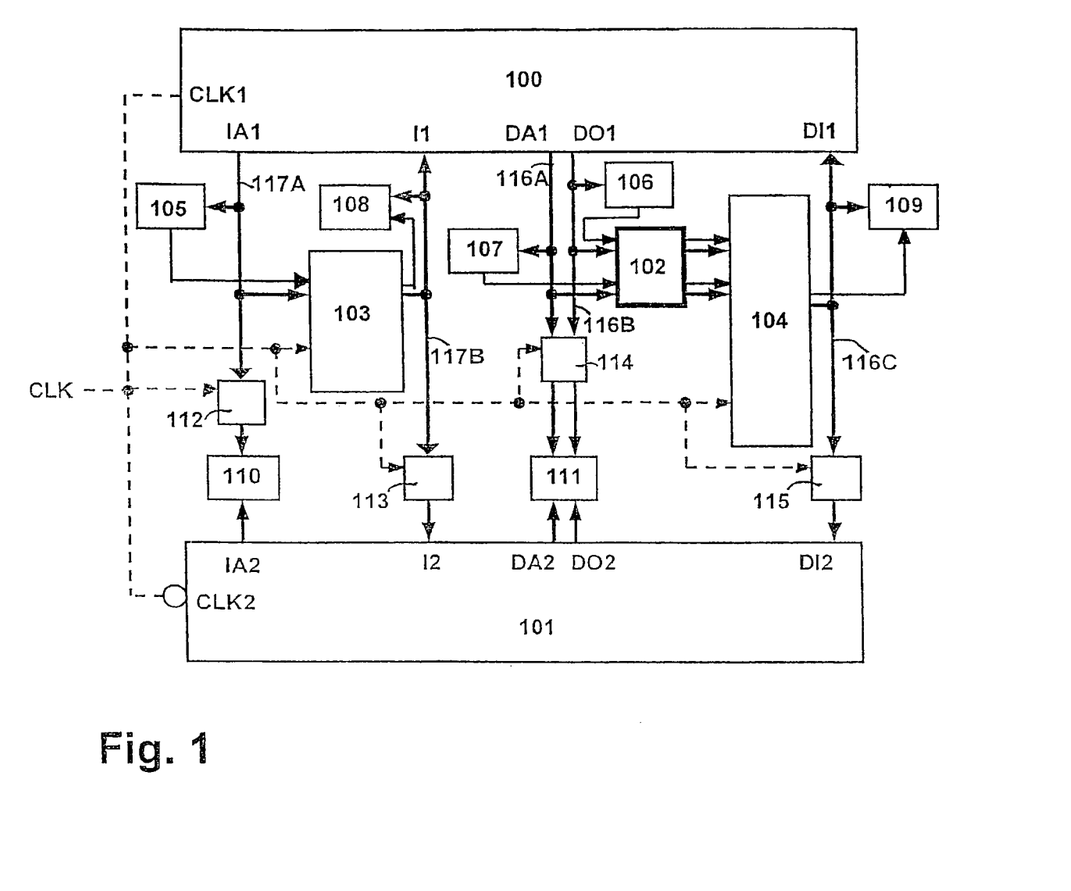
FIG. 1 shows a dual processor system according to an exemplary embodiment of the present invention.

The clock pulse offset is elucidated in greater detail with the aid of FIG. 1:

FIG. 1 shows a dual processor system having a first processor 100, in particular a master processor, and a second processor 101, in particular a slave processor. The entire system is operated at a specifiable clock pulse or at specifiable clock pulse cycles CLK. It is supplied with the clock pulse via clock input CLK1 of processor 100 as well as via clock input CLK2 of processor 101. Moreover, by way of example, a special feature for fault detection is included in this dual core system in that first processor 100 as well as second processor 101 are operating at a time offset, in particular a specifiable time offset or a specifiable clock pulse offset. Any desired time is specifiable as time offset in this context, as is any desired clock pulse with respect to an offset of the clock pulse cycles. This may be an integral offset of the clock cycle, but also, as also shown in this example, an offset of 1.5 clock cycles, for instance, where first processor 100 is operating, or is being operated, at said 1.5 clock cycles before second processor 101. This offset is able to prevent the occurrence of common mode faults or failures, which interfere with the processors, i.e., the cores of the dual core system, in the same manner and therefore remain undetected. That is to say, they concern common mode faults of the type that affect the processors at different points in time in the program sequence due to the offset, and as a result cause different effects with respect to the two processors by which faults become detectable. Faults of the same type without clock pulse offset might not be detectable in a comparison, which is avoided in this manner. Offset components 112 through 115 are implemented in order to implement an offset with respect to the time or the clock pulse in the dual processor system, in particular, 1.5 clock pulse cycles in this case.

To detect the mentioned common mode faults, this system is configured, for instance, to operate at a specifiable time offset or clock cycle offset, in particular 1.5 clock pulse cycles in this case; that is to say, while one processor such as processor 100 addresses the components directly, in particular external components 103 and 104, second processor 101 is operating at a delay of precisely 1.5 clock pulse cycles relative thereto. In order to generate the desired one-and-a-half clock cycle delay, i.e., 1.5 clock pulse cycles in this case, processor 101 is supplied by the inverted clock, i.e., the inverted clock cycle, at clock pulse input CLK2. As a result, however, the aforementioned terminals of the processor, i.e., its data and instructions, must be delayed by the mentioned clock pulse cycles via the buses, in particular, 1.5 clock pulse cycles in this case, for which purpose offset and delay components 112 through 115 are provided, as mentioned. Apart from the two processors 100 and 101, components 103 and 104 are provided, which are connected to both processors 100 and 101 via buses 116, made up of bus lines 116A and 116B and 116C, and 117, made up of bus lines 117A and 117B. 117 is an instruction bus where an instruction address bus is denoted by 117A and the partial instruction (data) bus is denoted by 117B. Address bus 117A is connected to processor 100 via an instruction address connection IA1 (instruction address 1), and to processor 101 via an instruction address connection IA2 (instruction address 2). The instructions themselves are transmitted via partial instruction bus 117B, which is connected to processor 100 via an instruction connection I1 (instruction 1), and to processor 101 via an instruction connection I2 (instruction 2). Interposed in this instruction bus 117, made up of 117A and 117B, is a component 103 such as an instruction memory, in particular a secure instruction memory or the like. This component, too, in particular in the form of an instruction memory, is operated at clock pulse CLK in this example. In addition, a data bus is shown by 116, which includes a data address bus or a data address line 116A and a data bus or a data line 116B. 116A, i.e., the data address line, is connected to processor 100 via a data address line DA1 (data address 1), and to processor 101 via a data address line DA2 (data address 2). The data bus or data line 116B is connected to processor 100 and processor 101 via a data connection DO1 (data out 1) and a data connection DO2 (data out 2), respectively. A further part of data bus 116 is data bus line 116C, which is connected to processor 100 or processor 101 via a data connection DI1 (data in 1) and a data connection DI2 (data in 2), respectively. Interposed in this data bus 116 made up of lines 116A, 116B and 116C is a component 104 such as a data memory, in particular a secure data memory, or the like. This component 104 is also supplied by clock pulse CLK in this example.

Components 103 and 104 are representative of any components that are connected to the processors of the dual processor system via a data bus and/or instruction bus and which may receive or output faulty data and/or instructions with regard to write operations and/or read operations according to the accesses via data and/or instructions of the dual processor system. It is true that fault detection generators 105, 106 and 107 are provided for fault avoidance, which generate a fault identification such as a parity bit or also some other fault code such as an error correction code, i.e., ECC, or the like. Also provided in this context are the corresponding error detection check devices, or check devices 108 and 109, for checking the particular error identification, that is, for example, the parity bit or some other error code such as ECC.

The comparison of the data and/or instructions with regard to the redundant execution in the dual processor system is performed in comparators 110 and 111, as illustrated in FIG. 1. However, if there is a time offset, in particular a clock or clock cycle offset, between processors 100 and 101, caused either by a non-synchronous dual processor system or, in a synchronous dual processor system, by errors in the synchronization or also, as in this particular example, by a time or clock cycle offset desired for the purpose of error detection, especially of 1.5 clock cycles in this case, then a processor, in particular processor 100, is able to write or read faulty data and/or instructions into components at this time or clock offset, especially external components such as, in particular, memories 103 or 104 in this case, but also with respect to other participants or actuators or sensors. For example, it may also incorrectly implement a write access instead of an intended read access because of this clock offset. These scenarios lead to faults in the entire system, in particular without any clear possibility of indicating which data and/or instructions have just been modified incorrectly, which also creates the recovery problem.

In order to solve this problem, a delay unit 102 as shown is inserted into the lines of the data bus and/or the instruction bus. For reasons of clarity, only the insertion into the data bus is shown. This is possible for the instruction bus as well. This delay unit 102 delays the accesses, in particular the memory accesses in this case, such that a possible time or clock offset is compensated, especially in an error detection, for instance via comparators 110 and 111, at least until, for instance, the error signal is generated in the dual processor system, i.e., the error detection has been implemented in the dual processor system. Different variants may be implemented in this context:

Delaying the write and read operations, delaying only the write operations or also, although not preferred, delaying the read operations. In the process, using a change signal, in particular the error signal, a delayed write operation may be converted into a read operation in order to prevent faulty writing.

Figure 2:
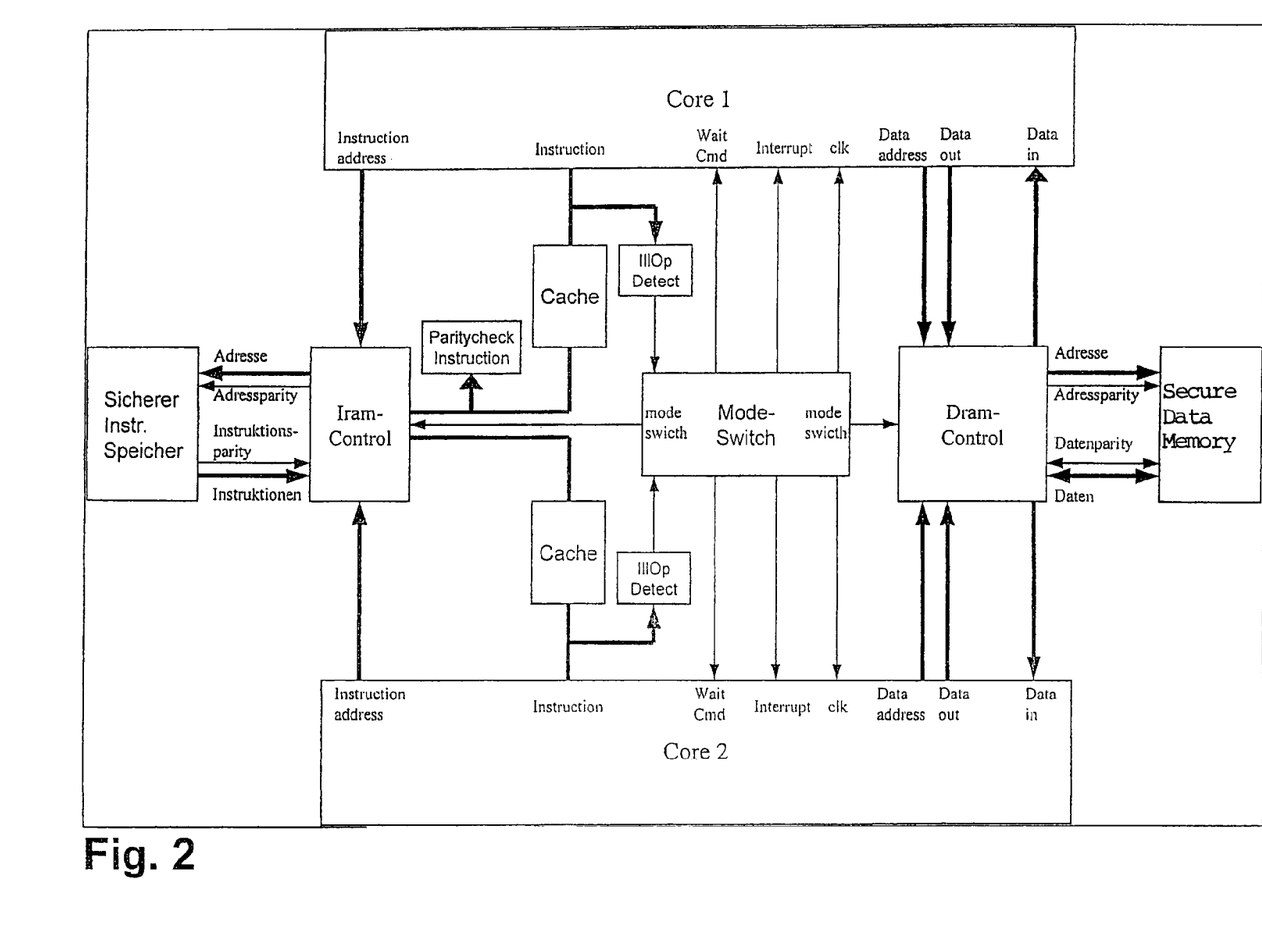
FIG. 2 shows an exemplary data distribution unit (DDU) according to an exemplary embodiment of the present invention.

With the aid of FIG. 2, there will now follow an exemplary implementation with respect to the data distribution unit (DDU), which may be made up of a device for detecting the switchover wish (by IIIOPDetect), the mode switch unit, as well as the Iram and Dram control component:

IIIOpDETECT: The switchover between the two modes is detected by the switch detect units. This unit lies between the cache and the processor on the instruction bus and monitors whether instruction IIIOp is loaded into the processor. If the instruction is detected, this event is reported to the mode switch unit. The switch detect unit is provided individually for each processor. The switch detect unit need not have error tolerance since it is present in duplicate and thus redundantly. On the other hand, it is possible to design this unit to be fault-tolerant and thus as singular unit, but the redundant implementation is preferred.

Mode switch: The switchover between the two modes is triggered by the switch detect unit. If a switchover is to occur from lock into split mode, both switch detect units detect the switchover since both processors are processing the same program code in lock mode. The switch detect unit of processor 1 detects this 1.5 clock pulses in advance of the switch detect unit of processor 2. The mode switch unit stops processor 1 for two clock pulses, using the wait signal. Processor 2 is stopped 1.5 clock pulses later, but only for half a clock pulse so that it is synchronized with respect to the system clock pulse. Subsequently, the status signal is switched to split for the other components, and the two processors continue working. In order for the two processors to then execute different tasks, they must diverge in the program code. This is done by implementing a read access to the processor ID immediately after switching into the split mode. This read-out processor ID differs for each of the two processors. If a comparison is then made for a setpoint processor ID, the corresponding processor may subsequently be brought to another program point with the aid of a conditional jump command. In a switchover from split mode into lock mode, one processor will notice this, or one of the two will notice it first. This processor will execute program code that contains the switchover instruction. This is registered by the switch detect unit, which notifies the mode switch unit accordingly. It stops the corresponding processor and notifies the second processor of the synchronization wish by an interrupt. The second processor receives an interrupt, whereupon it is able to execute a software routine to end its task. It then also jumps to the program point where the instruction for a switchover is found. Its switch detect unit now likewise signals the wish for a mode switch to the mode switch unit. At the next rising system clock pulse edge the wait signal is deactivated for processor 1, and 1.5 clock pulses later for processor 2. Both are now working in synchrony again at a clock pulse offset of 1.5 clock pulses.

If the system is in lock mode, both switch detect units must notify the mode switch unit of their wish to be put into split mode. If this switchover wish is indicated by one unit only, the error is detected by the compare units since they continue to be supplied with data by one of the two processors and these data do not match those from the stopped processor.

If both processors are in split mode and one does not switch back into lock mode, this may be detected by an external watchdog. In response to a trigger signal for each processor, the watchdog notices that the waiting processor is no longer responding. If only one watchdog signal is available for the processor system, then the triggering of the watchdog must occur in lock mode only. The watchdog would therefore detect that the mode switchover did not occur. The mode signal is present as dual rail signal. Here, "10" stands for the lock mode, and "01"" for the split mode. In the case of "00" and "11", errors have occurred.

Iram control: The access to the instruction memory of the two processors is controlled via the IRAM control. It must have a safe design since it is a single point of failure. It is made up of two finite automatons for each processor: in the form of one clock-synchronized iram1clkreset and one asynchronous readiram1. In the safety-critical mode, the finite automatons of the two processors monitor each other, and in performance mode they operate separately.

The reloading of the two caches of the processors is controlled by two finite automatons, one synchronous finite automaton iramclkreset and one asynchronous readiram. These two finite automatons also distribute the memory accesses in split mode. Processor 1 has the higher priority in this context. After accessing of the main memory by processor 1, and if both processors then wish to access the main memory again, processor 2 is granted permission to access the memory. These two finite automatons are implemented for each processor. In lock mode, the output signals of the automatons are compared in order to be able to detect occurring errors.

The data for updating cache 2 in lock mode are delayed by 1.5 clock pulses in the IRAM control unit.

In bit 5 in register 0 of syscontrol it is encoded which core is involved. Core 1 is bit 0, and in core 2 it is high. This register is mirrored into the memory region having the address 65528.

In a memory access of core 2, it is first checked in which mode the processor is in. If it is in lock mode, its memory access is suppressed. This signal is available as common rail signal since it is safety-critical.

The program counter of processor 1 is delayed by 1.5 clock pulses in order to be comparable to the program counter of processor 2 in lock mode.

In split mode, the caches of the two processors may be reloaded differently. If a switchover occurs into the lock mode, the two caches are not coherent relative to one another.

The two processors may therefore deviate from one another, and the comparators signal an error as a result. In order to prevent this, a flag table is set up in the IRAM control. There it is noted whether a cache line was written in lock mode or in split mode. In lock mode, the entry corresponding to the cache line is set to 0 in a cache line reloading, and in split mode it is set to 1, even in a cache updating of the cache line of only one cache. If the processor performs a memory access in lock mode, it is checked whether this cache line was updated in lock mode, i.e., is the same in both caches.

In split mode the processor is always able to access the cache line, regardless of the state of the flag_vector. This table has to be provided only once since the two processors drift apart in an error and this error is reliably detected at the comparators. Since the access times are relatively high on the central table, this table may also be copied for each cache.

DramControl: In this component the parity is formed for the address, data and memory control signals of each processor.

There is one process for both processors for blocking the memory. This process need not be implemented securely since faulty memory accesses in lock mode are detected by the comparators and no safety-relevant applications are executed in split mode. Here it is checked whether the processor wishes to block the memory for the other processor. This blocking of the data memory is implemented by an access to the memory address $FBFF$=64511. This signal is to be applied for precisely one clock cycle even if a wait command is present at the processor at the time of the call.

The finite automaton for administering the data memory accesses is made up of two main states:

Processor status lock: The two processors are operating in lock mode, i.e., the functionality of data memory locking is not required. Processor 1 coordinates the memory accesses.

Processor status split: Now, an access conflict resolution with respect to the data memory is required, and blocking of the memory must be able to occur.

The state in split mode is in turn subdivided into seven states, which resolve the access conflicts and are able to block the data memory for the respective other processor. If both processors desire access at the same time, the indicated sequence simultaneously constitutes the priority.

Core1/_Lock: Processor 1 has blocked the data memory. If processor 2 wants to access the memory in this state, it is stopped by a wait signal until processor 1 releases the data memory again\.

Core2\_Lock: Is the same state as the previous state, with the exception that processor 2 now blocks the data memory and processor 1 is stopped in data memory operations.

lock1\_wait: The data memory was blocked by processor 2 when processor 1 also wanted to reserve it for itself. Processor 1 is therefore wait-listed for the next memory blocking.

nex: The same for processor 2. The data memory was blocked by processor 1 during the blocking attempt. Processor 2 is wait-listed for the memory. In a normal memory access without blocking, processor 2 may have access before processor 1 if processor 1 had its turn before.

Memory access of processor 1: The memory is not blocked in this case. Processor 1 is allowed access to the data memory. If it wishes to block it, it may do so in this state.

Memory access by processor 2. Processor 1 did not wish to access the memory in the same clock pulse, so that the memory is available to processor 2.

No processor desires access to the data memory.

As mentioned, the DDU is made up of the switchover wish detection (IIIOPDetect), the mode switch unit and the Iram and DramControl.

Figure 3:
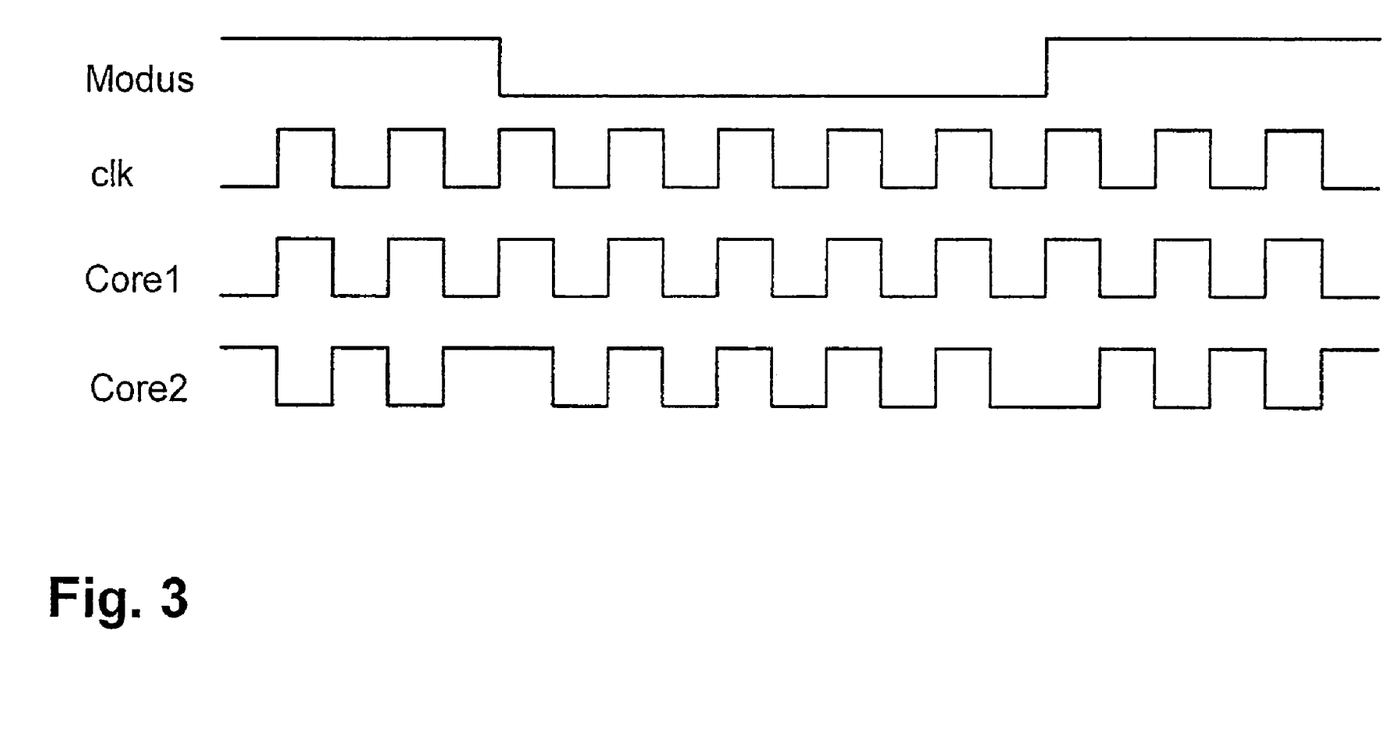
FIG. 3 shows the clock changeover according to an exemplary embodiment of the present invention.

FIG. 3 shows the clock changeover in an example, so that a clock changeover is carried out relative to the one mode compared to the other mode. Shown are the two modes, clock pulse clk and the two processor or core clock pulses.

In one mode, the two processors operate at a clock pulse offset. It may be mutually offset by whole clock pulses or also by fractions of the clock pulse. Another variant is that a different clock pulse frequency is used in the two modes. In the safety-critical mode, for instance, a lower clock pulse than in performance mode may be used in order to suppress interference. These two variants may also be combined with one another.

The core of the present invention therefore is the mode-dependent clock changeover.

In addition, however, the illustrated special implementation also achieves the aspects mentioned above.

Figure 4:
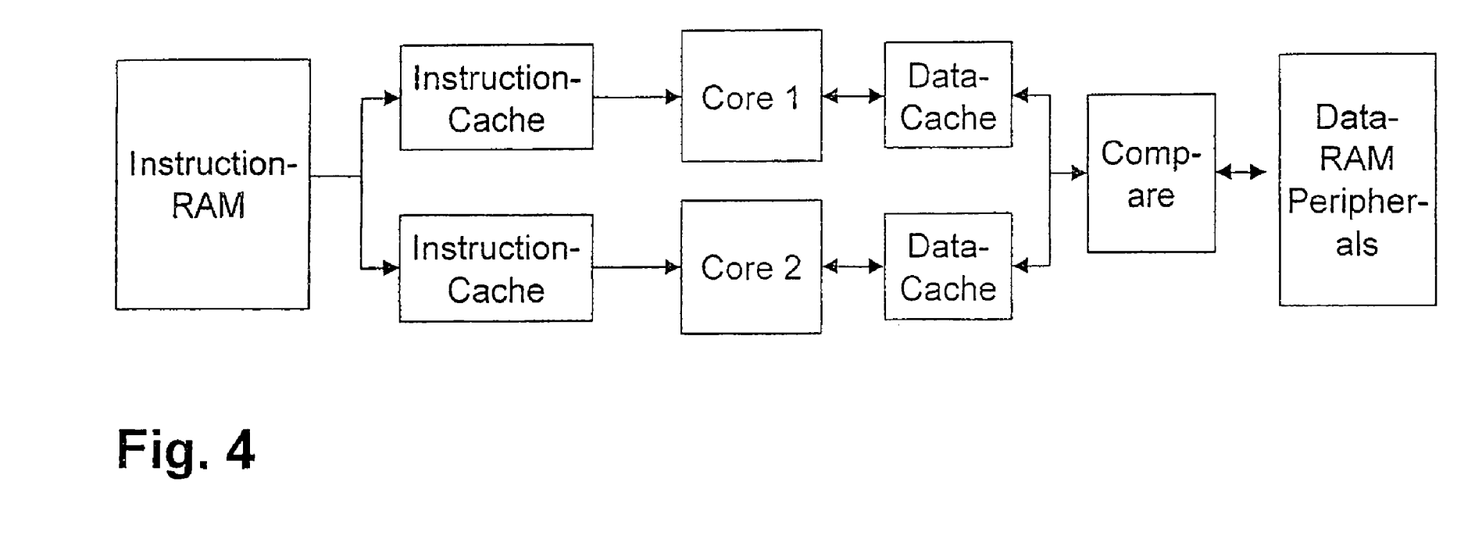
FIG. 4 shows a schematic diagram of a dual processor system according to an exemplary embodiment of the present invention.

In particular, in the implementations of dual processor systems (dual core), one cache is provided for each processor, as schematically shown again in FIG. 4. One cache is usually not sufficient since, from a spatial point of view, this cache must be disposed between the two processors. Due to the long propagation time between the cache and the two processors, the two processors would therefore be able to operate at a limited clock pulse frequency only.

Caches are used as fast intermediate memory so that the processor need not always fetch the data from the slower main memory. In implementing a cache great attention must be paid to its access time to make this possible. This time is made up of the actual access time for retrieving the data from the cache, and of the time for forwarding the data to the processor. If the cache is disposed at a great distance from the processor, the forwarding of the data takes very long, and the processor is no longer able to operate at its full clock pulse. Due to this timing problem, a separate cache may be provided for each processor and/or core in this exemplary dual processor system.

Figure 5:
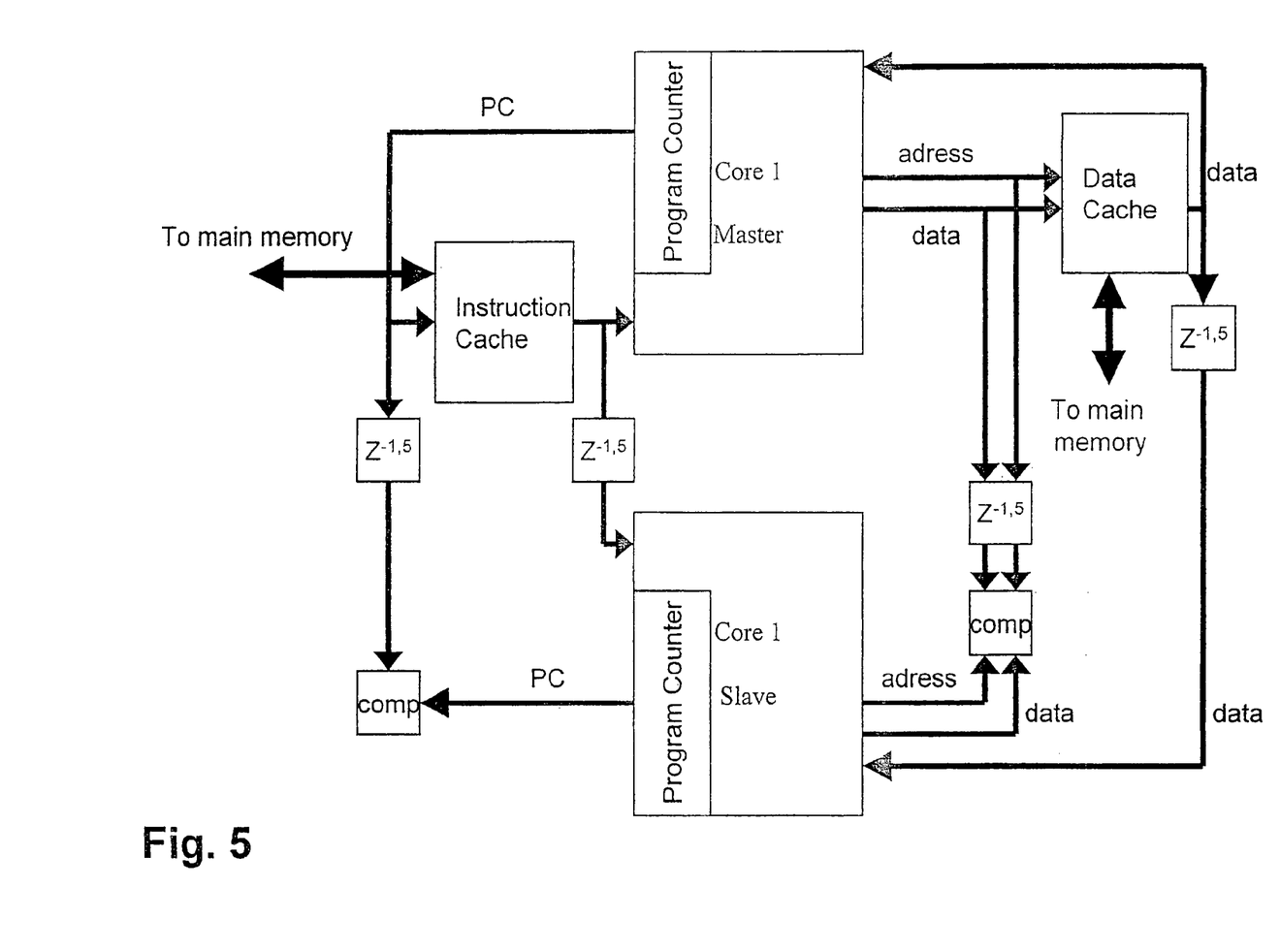
FIG. 5 shows a method of operating the dual processor system according to an exemplary embodiment of the present invention.

If these two processors are then operated at a clock pulse offset, the method provided in FIG. 5 makes it possible to dispense with the second cache for the slave processor. A cache requires a great deal of chip area and also a lot of current. As a result, it also generates considerable waste heat, which must be dissipated. If one cache can be dispensed with, a dual processor system is able to be implemented at considerably lower cost.

A mode-dependent clock changeover of the processors or cores as in the previously described example embodiment is also possible in a system having one cache.

As mentioned, in the dual processor system provided here as additional exemplary embodiment, one processor is the master and one processor is the slave. The master processes the data first and therefore also controls the peripheral components such as memories, cache, DMA controller etc. The slave processes the same data using a clock pulse offset of 1.5 clock pulses in this case, by way of example. This also means that it also receives the data from the shared memory and from the external components at a delay amounting to this time interval. The output data of the two processors such as memory address, data, etc. are compared to each other. To allow the data to be compared to each other, the results of the master must also be buffer-stored for 1.5 clock pulses. Such an exemplary system is shown below.

Figure 6:
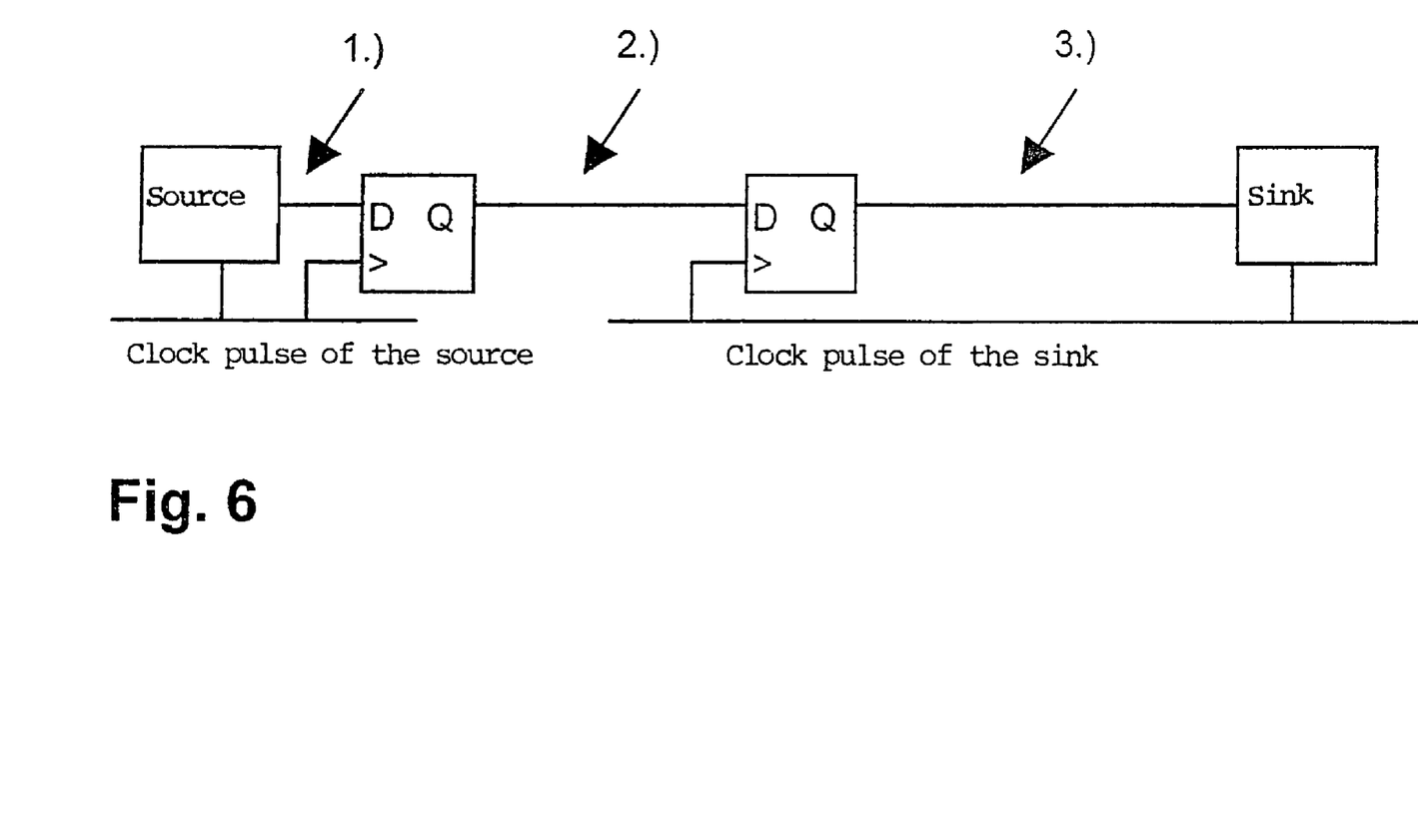
FIG. 6 shows a system including a master and a slave according to an exemplary embodiment of the present invention.

In order to be able to use one cache for both processors according to FIG. 5, the instruction and data caches are disposed directly at the master, as in a single processor. The master consequently need not accept performance losses with regard to the propagation times between cache and processor. Since the slave does not process the data until 1.5 clock pulses later, this time may be used to guide the data to the second processor, which then is spatially at a greater distance from the cache. Given an exemplary clock pulse offset of 1.5 clock pulses, two flip-flops may be employed to this end, as shown in FIG. 6. The first is controlled by the clock pulse of the master, the second by the clock pulse of the slave. The first flip flop is placed directly at the output of the source. The second is placed closer to the slave, according to the distance that the signal is able to travel during the difference between the two clock pulses.

In a time offset of 1.5 clock pulses, this corresponds to the propagation time of half a clock pulse, and in a clock pulse offset of two clock pulses, to the propagation time of one cycle. The second flip flop then takes over the signal. The path that the signal is able to travel during a full clock pulse may then be bridged again. In the figure this is illustrated by 1.), the close proximity to the sink; 2.) corresponds to the distance that may be covered during the clock pulse difference; and, 3.) is the length that is able to be covered within one cycle after the second flip-flop.

What is claim is:

1. A method for clock changeover in a system having at least two processing units, comprising:

switching over, by a switchover device, between at least two operating modes of the system; and at least one of (a) activating and (b) deactivating a clock changeover in at least one processing unit in a switchover of the operating mode;

wherein the at least two operating modes includes (a) a safety mode under which the at least two processing units process in synchronization with a clock offset a same program and a same data, and (b) a performance mode under which the at least two processing units process in clock edge synchronization at least one of a different program and a different data and wherein the switching over is based on whether to switch from the safety to the performance mode or from the performance to the safety mode.

2. The method according to claim 1, wherein the clock changeover is implemented such that the processing units operate at a specifiable phase offset.

3. The method according to claim 2, wherein the phase offset is specified as a half-integer.

4. The method according to claim 3, wherein the phase offset is specified at 1.5 clock pulses.

5. The method according to claim 2, wherein the phase offset is specified in a switchover into the safety mode.

6. The method according to claim 2, wherein, in a switchover into a performance mode, the phase offset is compensated, so that the processing units are operating in phase in performance mode.

7. The method according to claim 2, wherein the phase offset is specified such that identical instructions are processed in the at least two processing units at a time offset that is not equal to zero.

8. The method according to claim 1, wherein, upon activation, a changeover of the clock frequency is implemented such that one processing unit operates at a higher clock frequency than the other processing unit.

9. A unit for clock changeover in a system having at least two processing units, comprising:

a switchover device configured to implement a switchover between at least two operating modes of the system, the unit configured to at least one of (a) activate and (b) deactivate a clock changeover in at least one processing unit in a switchover of the operating mode;

wherein the at least two operating modes includes (a) a safety mode under which the at least two processing units process in synchronization with a clock offset a same program and a same data and (b) a performance mode under which the at least two processing units process in clock edge synchronization at least one of a different program and a different data and wherein the switch over is based on whether to switch from the safety to the performance mode or from the performance to the safety mode.

10. The unit according to claim 9, wherein the unit is configured to implement the clock changeover such that the processing units operate at a specifiable phase offset.

11. The unit according to claim 10, wherein the unit is configured such that the phase offset is specified as half-integer.

12. The unit according to claim 11, wherein the unit is configured such that the phase offset is specified as 1.5 clock pulses.

13. The unit according to claim 10, wherein the unit is configured such that the phase offset is specified as integral.

14. The unit according to claim 10, wherein the unit is configured such that the phase offset is specified in a switchover into safety mode.

15. The unit according to claim 10, wherein the unit is configured such that, in a switchover into a performance mode, the phase offset is compensated, so that the processing units are operating in phase in performance mode.

16. The unit according to claim 10, wherein the unit is configured such that the phase offset is specified such that identical instructions are processed in the at least two processing units at a time offset that is not equal to zero.

17. The unit according to claim 9, wherein the unit is configured such that, upon activation, a changeover of the clock frequency is implemented such that one processing unit is operating at a higher clock frequency than the other.

18. The unit according to claim 9, wherein the unit is configured such that the clock changeover is triggered by a mode signal, which indicates an operating mode.

19. The unit according to claim 9, wherein the unit is configured such that the clock changeover is triggered by connecting or disconnecting at least one trigger circuit.

20. The unit according to claim 9, wherein the unit is configured such that the phase offset is triggered by at least one of (a) connecting and (b) disconnecting at least one trigger circuit.

21. A system, comprising:

a unit for clock changeover in a system having at least two processing units, the unit including a switchover device configured to implement a switchover between at least two operating modes of the system, the unit configured to at least one of (a) activate and (b) deactivate a clock changeover in at least one processing unit in a switchover of the operating mode;

wherein the at least two operating modes includes (a) a safety mode under which the at least two processing units process in synchronization with a clock offset a same program and a same data, and (b) a performance mode under which the at least two processing units process in clock edge synchronization at least one of a different program and a different data, and wherein the switch over is based on whether to switch from the safety to the performance mode or from the performance to the safety mode.

* * * * *